United States Patent [19]

Papazian et al.

[11] Patent Number: 5,559,410

[45] Date of Patent: Sep. 24, 1996

[54] DEVICE FOR CONTROLLING THE FUNCTION OF AN ELECTRIC STARTING MOTOR FOR A WINDSHIELD WIPER OF A REAR WINDOW OF AN AUTOMOTIVE VEHICLE AND FOR SUPPLYING AN ELECTRIC MOTOR PARTICULARLY TO ACTIVATE THE WINDSHIELD

[75] Inventors: Samuel Papazian, Chatellerault; Eric Douville, Colombes, both of France

[73] Assignee: Valeo Systemes D'Essuyage, Le Bretoneux, France

[21] Appl. No.: 169,653

[22] Filed: Dec. 17, 1993

[30] Foreign Application Priority Data

Dec. 17, 1992 [FR] France ................................. 92 15237
Dec. 17, 1992 [FR] France ................................. 92 15238

[51] Int. Cl.$^6$ ........................................................ G05B 5/00
[52] U.S. Cl. ............................ 318/445; 318/444; 318/443
[58] Field of Search ................................ 318/443, 444, 318/445, DIG. 2; 307/10.1; 315/250.011; 160/11; 73/861.41

[56] References Cited

U.S. PATENT DOCUMENTS 3,028,533  4/1962  Wishart, Jr. .
3,583,021  6/1971  Druseikis .
4,314,186  2/1982  Gille et al. ............................. 318/434
5,336,980  8/1994  Levers .................................... 318/443

FOREIGN PATENT DOCUMENTS

0227849  7/1987  European Pat. Off. .
2521933  8/1983  France .
2541639  8/1984  France .
3825301  2/1990  Germany .
2152243  7/1985  United Kingdom .
2180078  3/1987  United Kingdom .

*Primary Examiner*—William M. Shoop, Jr.
*Assistant Examiner*—Karen Masih
*Attorney, Agent, or Firm*—Morgan & Finnegan, L.L.P.

[57] ABSTRACT

The invention proposes a process and a device for powering an electric motor (M) intended particularly to drive a windshield wiper arm of a motor vehicle, of the type comprising a control unit (2) connected to control elements (3) under user control and to position sensors (5, 6, 7) of the windshield wiper arm, and comprising means (9) of control of the supply to the motor controlled by the control unit, characterized in that it comprises means (2a) for switching off the supply to the motor at the end of a first determined time (TETA$_1$), whose inhibition is provided by the position sensors (5, 6, 7) so as to switch off the supply to the motor (M) during a second determined time (TETA$_2$) if these switching off means have not been inhibited by activation of a position sensor by the arm.

20 Claims, 4 Drawing Sheets

DEVICE FOR CONTROLLING THE FUNCTION OF AN ELECTRIC STARTING MOTOR FOR A WINDSHIELD WIPER OF A REAR WINDOW OF AN AUTOMOTIVE VEHICLE AND FOR SUPPLYING AN ELECTRIC MOTOR PARTICULARLY TO ACTIVATE THE WINDSHIELD

BACKGROUND OF THE INVENTION

1. Field of the Invention

This invention concerns a process and a device intended to supply power to an electric motor, particularly a motor driving the arm of an automobile windshield wiper.

2. Description of the Related Art

The state of the art already mentions many powering devices of this type which comprise a motor power control unit connected to a control element under the user's control, comprising windshield arm position sensors and including moreover means for controlling the power to the motor, for example in one direction or the other depending on the position of the arm, in order to sweep a glass surface, for example the windshield or rear window of the vehicle.

These means for controlling the power to the motor comprise for example relays activated by the control unit.

Certain devices likewise comprise means for protecting the electric driving motor in the event the output shaft is blocked, in order to prevent overheating likely to lead to the destruction of the motor.

These means of protection generally consist of a two-blade system arranged inside or outside the motor housing and sensitive to the motor's temperature, in order to interrupt the power supply to the motor when an increase in motor temperature is detected, for example if its output shaft is blocked.

However this structure involves a certain number of disadvantages, especially that of requiring the adjunction of an additional element and its connection to the control unit.

Furthermore, in a certain number of devices of the present state of the art, the operation of the motor power control unit is moreover controlled by a vehicle key contact which, just like the control element, is under the user's control and is in addition connected in series between a source of power supply and the motor powering control unit.

The control element can be a multiple control element, such as for example to control the intermittent or continuous sweeping of the windshield wiper's arm.

In certain devices of the present state of the art, an input terminal for the power to the control unit is connected to the midpoint between the key contact of the vehicle and the control element.

When the user causes the windshield wiper to stop by switching off the control element, the control unit controls the motor power supply so as to have it return the wiper arm to a determined parking position.

On the other hand, if the user operates the vehicle's key contact and opens it while the windshield wiper is running, the power to the motor control unit is interrupted so that the windshield wiper arm stops in the intermediate position.

This is why the device of this invention comprises means making it possible for the wiper arm driving motor control unit to bring the arm back to a parking position after the key contact or the control element is switched off.

In the following, the operation of the power supply device when the vehicle contact is switched on is designated as the contact operating mode. Moreover, the operation of the power supply device after the user has switched off the contact, for example by removing the key, is designated as the contactless operating mode. The purpose of this latter operating mode is to return the wiper arm to its parking position.

The devices of the current state of the art, even when they comprise a contactless operating mode, are not suited to the case when the driving motor is not running.

The invention aims at resolving these problems by proposing a simple and reliable process and a power supply device.

SUMMARY OF THE INVENTION

In fact, the invention proposes a process for the power supply of an electric motor, particularly a motor driving the windshield wiper arm of an motor vehicle, of the type consisting of at least temporarily interrupting the power supply to the motor in case of incorrect operation, or even non operation, characterized in that the power is interrupted at the end of a first time span defined as being sufficient to obtain a determined behavior of the windshield wiper arm under normal operating conditions.

According to another characteristic of the invention, interruption of the power supply to the motor is inhibited at the end of a second determined time span intended to enable a new test of power supply to the motor.

According to another characteristic of the invention, phases of power supply and interruption are repeated in alternation until said determined behavior of the windshield wiper arm is obtained.

According to another characteristic of the invention, phases of power supply and interruption are repeated in alternation until a certain total of unsuccessful attempts is reached.

According to another characteristic of the invention, when a certain total number of unsuccessful attempts is reached, the power supply to the motor is interrupted permanently.

The invention also concerns a device for the power supply of an electric motor, particularly one driving the windshield wiper arm of a motor vehicle, of the type comprising a control unit connected to control elements under the user's control and to a means of detection equipped with windshield wiper arm position sensors, and comprising a power supply control circuit.

According to another characteristic of the invention, the power supply device comprises means for switching off the power supply to the motor at the end of a determined time span, said means being connected to a means designed to cut the power supply to the motor during a second determine time span if these interrupting means have not been deactivated by activation of a position sensor by the windshield wiper arm.

According to another characteristic of the invention, said first determined time span is at least greater than the longest of the round trip times employed by the windshield wiper arm under normal operating conditions to travel from a determined starting position to a determined end position.

According to another characteristic of the invention, the control unit is designed to trigger off at least one new attempt at supplying power to the motor after an operating fault is detected during the first attempt.

According to another characteristic of the invention, said interruption means are connected to means for controlling the power supply to the motor.

According to another characteristic of the invention, the motor power supply control unit, whose operation is moreover controlled by a vehicle key contact and a motor operation control element activated by the user and connected in series between a power supply source and the control unit, with a control unit power supply terminal being connected to the power source, in parallel on the key contact and the control element, in order to enable the unit to control the windshield wiper arm driving motor so that it returns the arm to a parking position after the key or control unit contact is switched off.

BRIEF DESCRIPTION OF THE DRAWING

Other characteristics and advantages of the invention will appear from a reading of the following detailed description which will be better understood by reference to the attached drawings in which.

DESCRIPTION OF THE PREFERRED EMBODIMENTS

Figure 1:
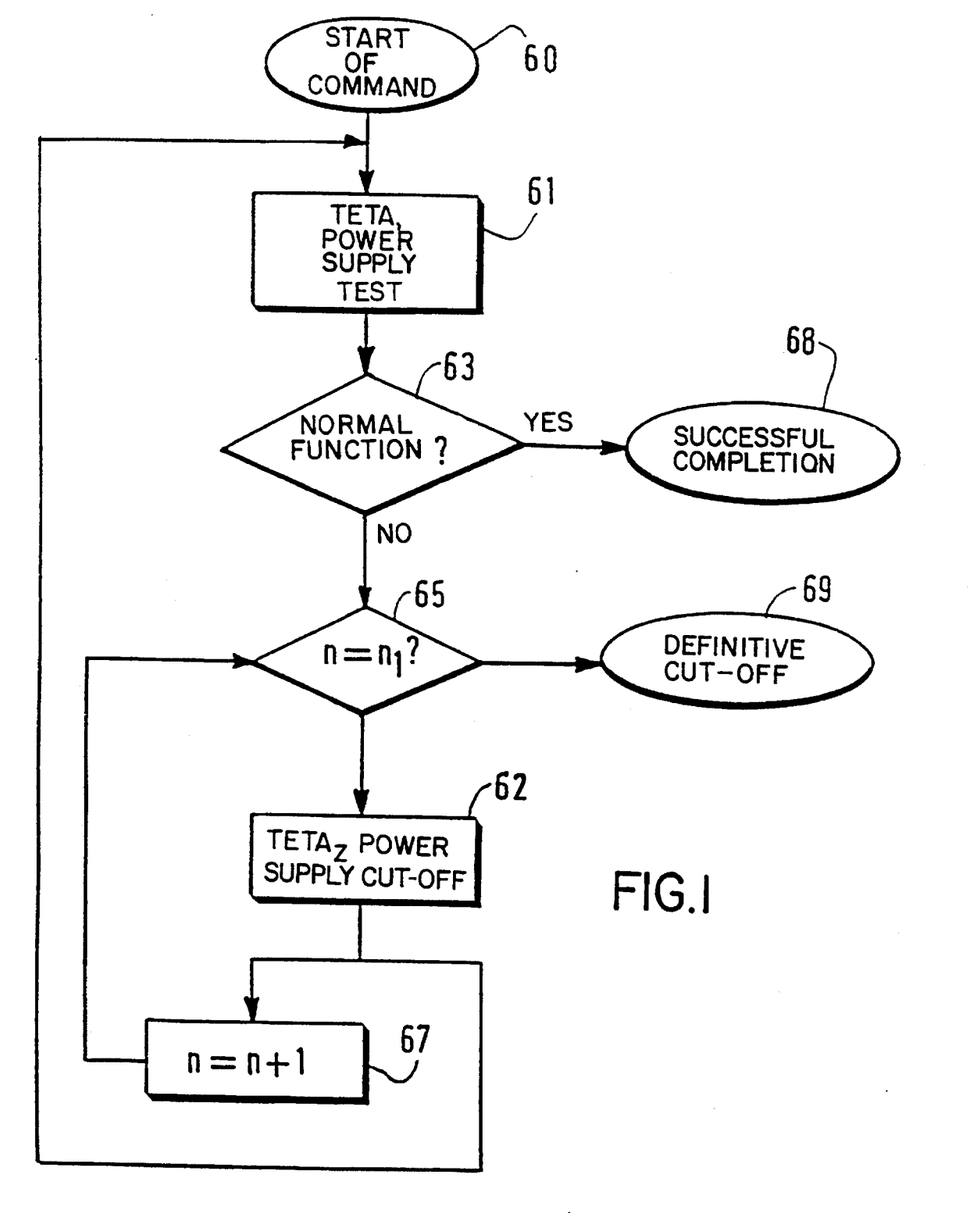
FIG. 1 is a block diagram showing the steps in the power supply process according to the invention.

In FIG. 1, the different steps of the power supply process are presented in the form of a block diagram in which block 60 represents the beginning of the windshield wiper arm control operation.

The first step itself, referenced 61 in FIG. 1, consists in performing a test of power supply to the motor.

If, in the interval of a first time span $TETA_1$ this test is positive, i.e. the windshield wiper arm behaves as expected, then the algorithm terminates successfully in a step referenced 68.

Otherwise, it is the case when the driving motor has a malfunction or doesn't not operate at all. The second step itself consists then in interrupting the power supply to the motor during a second determined time span $TETA_2$. This second step itself is referenced 62 in FIG. 1 and is followed by a new attempted power supply. The algorithm thus loops back to step 61.

But, beforehand, a test 65 consists in determining whether the power supply test just performed in 61 was the last allowable attempt.

In fact, the power supply tests are performed by looping between the power supply step 61, on the one hand, and step 62—interruption and wait during a time span $TETA_2$, on the other hand, the total number of successive power supply attempts, i.e. also the number of iterations of the loop, being limited to a maximum number of attempts $n_1$.

Thus the step 65 consists in comparing a number n of power supply attempts performed with the maximum number of attempts $n_1$. If the answer to test 65 is "no", i.e. if the number n of power supply attempts performed is strictly less than the maximum number $n_1$ of unsuccessful tests, then an additional power supply attempt can be tried after a waiting time equal to the second determined time span $TETA_2$.

As indicated above, the diagram therefore loops from step 62—interruption during a determined time $TETA_2$ —to step 61—power supply attempt.

In parallel, the number n of power supply attempts is increased by one during a step referenced 67.

If, on the other hand, the answer to test 65 is "yes", i.e. if a number of attempts equal to the maximum number of unsuccessful tests $n_1$ have already been performed, then the algorithm terminates with a step 69 whereby the power supply to the motor is interrupted permanently. The power supply to the motor is then definitively cut off.

The operation of the power supply device according to the invention is described below in a positive logical mode of execution, i.e. a logical level 1 is represented by a high state signal or a positive voltage pulse. This mode of execution is a preferred mode and in no way does it limit how the device of the invention can be executed.

Figure 2:
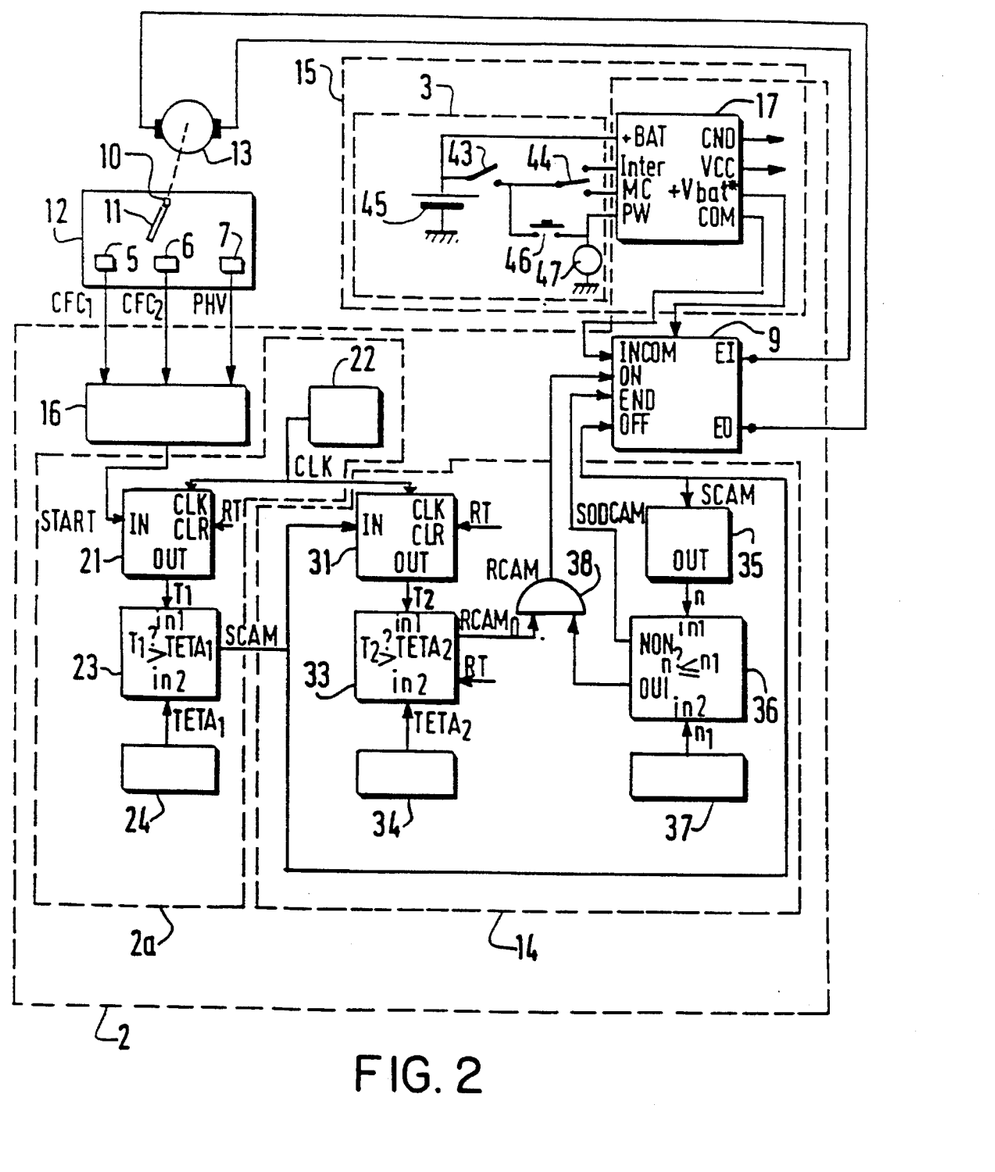
FIG. 2 is a view representing a visual diagram illustrating the operation of a power supply device according to the invention.

In FIG. 2 the electric motor power supply device 13 comprises, according to the invention, a control unit 2 composed of various elements, the details of which are given below. User activated control elements 3 are connected to a control circuit 17 of the control unit 2, with said control elements 3 and said control circuit 17 forming a wiping and power supply control circuit 15. In addition, the power supply device also comprises a means of detection 12 of the position of the windshield wiper arm equipped with sensors 5, 6 and 7.

A first sensor 5 is located in one of the extreme sweeping positions, a second sensor 6 is located in the other of the extreme sweeping positions, and the third sensor 7 is located in the windshield wiper arm's parking position.

In addition, the windshield wiper arm is composed of a mobile element 11, for example mobile in rotation about a shaft 10.

Figure 3:
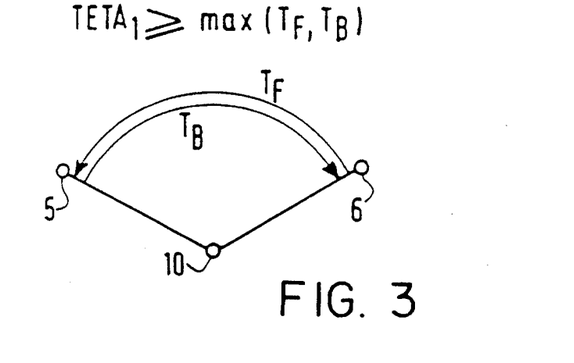
FIG. 3 is a diagram illustrating the definition of the first time span determined according to the principle of the invention.

In FIG. 3, the shaft 10 is represented as well as the extreme sweeping position sensors 5 and 6.

The mobile element 11 (not represented) can cover all of the angular sector included between said extreme positions. During sweeping, the direction of movement of the mobile element 11 is reversed when one of the extreme positions is reached.

As the driving motor of the windshield wiper arm rotates at a speed obeying to a known law, for example defined in the control circuit 17, the time necessary for the windshield wiper arm to reach one of the extreme positions indicated above after having passed beyond the other of these extreme positions is known with certainty.

Since the windshield wiper arm involves two opposite directions of movement, one can thus define a first time $T_F$ and a second time $T_B$. In a preferred mode of execution of the invention these two times are equal, although this does not limit the general nature of the principle of the invention. In the general case, $TETA_1$ is at least the longest of the times $T_F$ and $T_B$.

In FIG. 2, the sensors of extreme positions 5 and 6 deliver end of travel signals, respectively CFC1 and CFC2, in the form of a voltage pulse when they are activated. Likewise, the parking position sensor 7 delivers a parking signal, for example a signal PHV of parking beyond the glass, in the form of a voltage pulse when it is activated.

These three signals CFC1, CFC2 and PHV are transmitted to a detection module 16 to which the three sensors 5, 6 and 7 are connected directly.

This detection module is designed to generate a START signal which is transmitted to means 2a for cutting the power supply to the motor at the end of a first determined time span.

These means 2a consist of a first timer 21, a clock signal generator 22 such as an oscillator, a comparator 23 and a memory register 24.

The timer 21 begins to count the pulses appearing at its input CLX as soon as the START signal, which is transmitted by the detection module 16 at its input IN, gives a starting information in the form of a voltage pulse.

At any moment the timer has at its output OUT some information T1 on the time elapsed.

At any moment also, this information T1 is transmitted to a first input $in_1$ of the comparator 23 and is compared to the magnitude present at a second input $in_2$ of said comparator which is connected to the memory 24. The memory 24 contains the value of the first determined time $TETA_1$ defined above in connection with FIG. 2.

Furthermore, the timer 21 has a reset input CLR designed to receive a reset signal.

Thus, when the time elapsed since the last passage of the windshield wiper arm by an extreme position becomes greater than the predefined time $TETA_1$, the comparator 23 generates a SCAM signal interrupting the power supply to the motor which is transmitted to a means 14 of inhibition of the circuit 9 powering the motor 13.

This SCAM signal therefore has the effect of interrupting the power supply to the motor 13 via an inhibition command sent to the motor powering circuit 9. In fact, if at the end of the determined time span $TETA_1$ this position is not reached, i.e. if the position sensor 5 or 6, depending on the direction of movement of the windshield wiper arm, is not activated it can be concluded that the motor is experiencing a malfunction, which may be a mechanical blockage of its output shaft, and that it is therefore necessary to interrupt the power supply.

On the other hand it may be that the malfunction of the motor, or the mechanical impediment having led to its blockage, is only temporary. In any event, it is worthwhile repeating the function test of the windshield wiper arm driving motor.

This new attempt can be performed after a second time $TETA_2$ has elapsed since the inhibition of the power supply to the motor; this is in order to allow the electric circuits of the motor to cool down, thus preventing their destruction.

For this reason the cyclic attempts to start the motor 13 must not be repeated indefinitely, especially if the power supply device is in the parking position mode, when the driver has already removed the ignition key and left the vehicle. In fact, such a situation would quickly lead to complete discharge of the vehicle's battery and to all the inconvenience this would cause for the driver.

The SCAM signal to cut the power supply to the motor triggers the operation of a second timer 31, similar to the first timer 21 of the means 2a for cutting the power supply to the motor, as previously described. This timer counts the time $T_2$ elapsed since the last inhibition of the power supply to the motor; its output is furthermore connected to a first input of a comparator 33, similar to the comparator 23 described previously.

When the time $T_2$ exceeds the value of a determined second time $TETA_2$, which is contained in a register 14 of a memory connected to a second input of the comparator 33, the output of said comparator 33 delivers a signal $RCAM_o$ for conditional resetting of the motor power supply circuit 9.

In parallel, the SCAM signal for cutting the power supply to the motor triggers the incrementation of a test counter 35 which counts the number of unsuccessful attempts performed to power the motor 13 so that the windshield wiper arm reaches its desired extreme position.

This test counter 35 comprises a +1 incrementation input and an output which is connected to a first input of a comparator 36 similar to the comparator 23 previously described, except that it has two outputs OUI and NON instead of a single one for the comparator 23. The second input of this comparator 36 is connected to a register 37 of a memory containing a determined number $n_1$ corresponding to the maximum number of unsuccessful tests allowed by the power supply device according to the invention.

When the number n of unsuccessful tests counted by the test comparator 35 is less than or equal to the number $n_1$ contained in the register 37, the test performed by the comparator 36 is positive and a logical level 1 is furnished by a first output OUI of this comparator to a first input of a logical gate ET referenced 38, while a logical level 0 is furnished by a second output NON of this same comparator 36. A signal of definitive blockage of the power supply circuit to the motor SBDCAM, furnished by this second output NON is thus maintained in the logical state 0.

In the opposite case, i.e. when the number n of unsuccessful tests counted by the test counter 35 is strictly greater than the number $n_1$ contained in the register 37, the test made by the comparator 36 is negative and a logical level 0 is furnished by the first output OUI of the comparator 36 to said first input of said logical gate ET referenced 38, while a logical level 1 is furnished by said second output NON of the comparator 36. Said definitive blockage signal of the power supply circuit to the motor SBDCAM, furnished by this second output NON, is then tripped to the logical state 1.

When the signal $RCAM_0$ and the signal present at the output OUI of the comparator 36 are simultaneously in the high state, i.e. when the time $T_2$ exceeds the value of the second determined time $TETA_2$ and the number n of unsuccessful attempts is less than or equal to the number $n_1$, the output signal from the logical gate ET referenced 38 moves to the high state. This output signal, designated below as reset signal of the power supply control to the motor RCAM, then transmits a logical level 1 to the corresponding input of the power supply circuit 9 to the motor, which results in canceling the inhibiting effect induced by the signal SCAM to cut the power supply to the motor and restarting the motor 13.

Moreover, when the time $T_2$ exceeds said second value of the determined time $TETA_2$ the output of the comparator 33 delivers, in addition to the signal $RSCAM_o$ described previously, a signal RCT resetting the first timer referenced 21. This signal, in fact, makes it possible to reinitialize the timer 21 in order to allow the second test to be carried out correctly.

The power supply circuit 9 to the motor is now described in order to specify the action of the various signals governing its operation, some of which having already been mentioned above.

The circuit 9 powering the motor comprises several inputs which are:

an input $+V_{bat}{}^*$ to receive the current coming from the battery and furnished by the control circuit 17;

at least one input INCOM serving to receive at least one motor control signal SCM which is furnished by the control circuit 17, as for example a control for the desired speed of operation of the motor 13;

an input OFF serving to receive a signal SCAM cutting the power supply to the motor, coming from the means 14 of inhibition of the power supply to the motor, and more precisely coming from the comparator 23;

and input ON serving to receive a signal RCAM resetting the motor power supply circuit, i.e. canceling the inhibition induced by the SCAM signal;

and an input END serving to receive a signal SBDCAM of definitive blockage of the power supply circuit to the motor, intended to permanently inhibit this circuit in case the maximum number of attempts has been reached without a positive result, this in order to prevent complete discharge of the battery.

This power supply circuit 9 to the motor comprises in addition at least two outputs EI and EO which are connected to the power supply terminals of the motor 13, such as a direct current motor.

Figure 4:
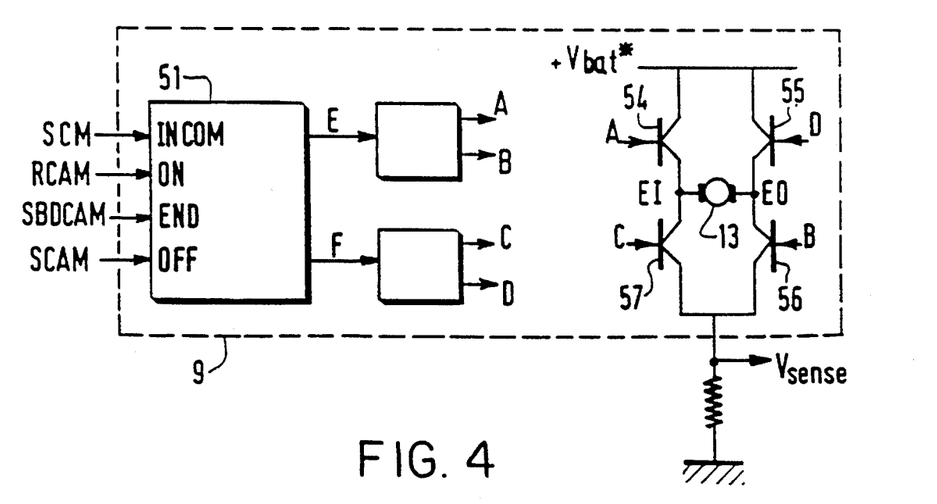
FIG. 4 is a diagram of a motor power supply circuit according to the invention.

This motor powering circuit 9 will be taken up in greater detail in connection with the description of FIG. 4.

The last element of the control unit 2 remaining to be described in connection with the diagram of FIG. 2 is the control circuit 17. This comprises various inputs which are in particular:

an input serving to receive the current from the vehicle's battery $+V_{bat}$;

three inputs Interm, MC and PW serving to receive signals emanating from the user activated control elements 3 and which are respectively a signal for intermittent operation, a signal for continuous operation and a signal for operation following an action of the windshield washer;

possibly other inputs serving to receive information on the operating conditions of the power supply device according to the invention, furnished by sensors and for example serving to adapt the windshield wiper arm's sweeping speed in function of the quantity of water on the glass surface or yet in function of other parameters.

The control circuit 17 comprises in addition a certain number of outputs which are, in particular:

two outputs GND and $V_{CC}$ between which a regulated power voltage is available to be utilized by the system of electronic means of the power supply device;

an output $+V_{bat}{}^*$ serving to furnish the motor power circuit 9 a source of power coming from the battery's voltage;

at least one COM command output serving to deliver at least one SCM motor control signal to the motor power supply circuit 9.

In a preferred mode of execution of the invention, the entire control unit 2 can be made in the form of a single integrated circuit such as a specific Asic integrated circuit.

In FIG. 2 the user activated control elements 3 are visible in the mode of execution of the invention.

These control elements allow the user to define the operating mode of the driving motor powering device. They can, for example, comprise a multi-control element 44 serving to determine intermittent or continuous operation of the motor, this also being called "commodo".

A pushbutton 46 can also be provided to control the operation of a pump 47 for the vehicle's windshield washer as well as pulse operation of the driving motor 13.

In FIG. 2 which represents a preferred mode of execution of these control elements 3, a power supply terminal for the control circuit 17, designated by reference +BAT in this figure, is connected to the power source 45, in parallel on a key contact 43 and the control element 44. This arrangement allows the control circuit and the power supply circuit to the windshield wiper arm driving motor to control said motor to return the windshield wiper arm to a parking position, this even after the key contact or the control element has been interrupted.

In FIG. 4, the motor power circuit 9 is detailed especially to show how the motor 13 is controlled, namely the inputs $+V_{bat}{}^*$ to receive the power emanating from the battery and furnished dy the control circuit 17, at least one input INCOM serving to receive at least one motor control INCOM signal which is furnished by the control 17, an input OFF serving to receive a SCAM signal to cut the power to the motor emanating from the means 14 of inhibition of the motor powering circuit, an input ON serving to receive a signal RCAM resetting the motor power circuit, i.e. canceling the inhibition induced by the SCAM signal, and a last input END serving to receive a SBDCAM signal of definitive blockage of the motor power circuit and emanating from the comparator 36.

The signals SCM, SCAM, RCAM and SBDCAM are transmitted to a control block 51 whose role is to cause the motor to operate in one direction or the other in function of the control information carried by said signals.

This control block generates reference signals E and F which carry sufficient logical information to control the operation of the motor 13.

When E and F are simultaneously in the logical state 0, the motor remains at rest. When the signal E is in the logical state 1 and the signal F is in the logical state 0 the motor turns in a first determined direction. Conversely, when the signal E is in the logical state 0 and the signal F is in the logical state 1, the motor 13 turns in a second determined direction.

The setting of the motor 13 in one direction or the other is provided by switching of a pair of transistors 54,56 or 55,57 respectively. Switching of these two pairs of transistors is provided by two pairs of signals A,B and C,D respectively, which are respectively generated by a control element of the transistors 52 or 53 and applied to the base of said pairs of transistors.

The arrangement of transistors 54, 55, 56, 57 is well known to the man of the art, as is the connection of the motor between the points EI and EO. Furthermore, a resistor 58 can be connected between the transmitter common to transistors 56 and 57, on the one hand, and the electric grounding of the assembly, on the other hand, so as to possibly serve for measuring a voltage $V_{sense}$ which is the image of the current circulating in the motor 13. This voltage $V_{sense}$ can be utilized as a measuring signal usable by the control block 51, for example.

Figure 5:
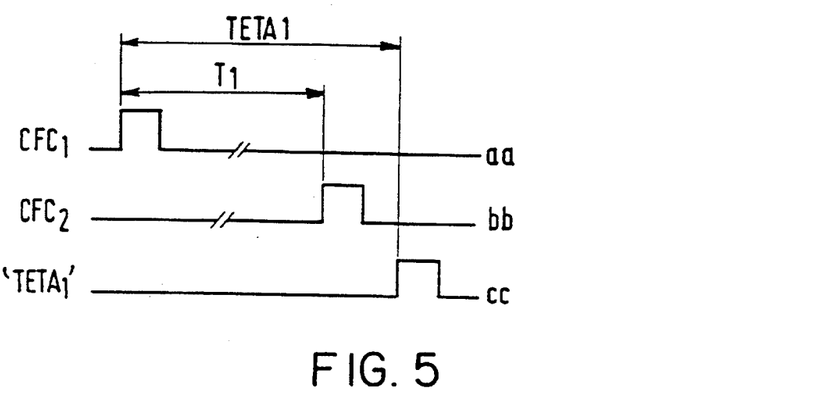
FIG. 5 is a time diagram of the signals present in the sensors during a normal operating phase of the windshield wiper arms.

In FIG. 5, a diagram of the signals $CFC_1$ and $CFC_2$ generated by the end-of-travel sensors respectively 5 and 6 is presented in curves aa and bb in the case of normal operation, i.e. when the time $T_1$ which separates activation of the sensor 5 from activation of the sensor 6 by the mobile element 11 of the windshield wiper, i.e. the time $T_1$ between the rising slope of the pulse on the signal $CFC_1$ and the rising slope of the pulse on the signal $CFC_2$, is less than the time $TETA_1$ defined in FIG. 2.

If one considers an imaginary signal '$TETA_1$' which shows a pulse when a time $TETA_1$ has elapsed since the start of the pulse from signal $CFC_1$ of curve aa, the above event can be considered by saying that the curve bb has a pulse prior to that of curve cc which takes place in a time $TETA_1$.

Figure 6:
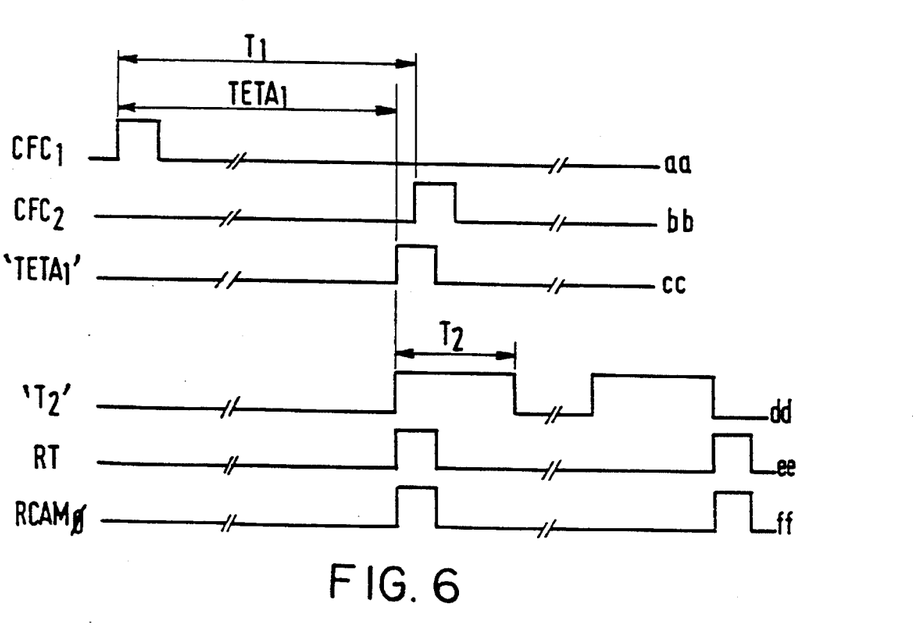
FIG. 6 is a chronogram of the signals of the control unit according to the invention in case of an abnormal phase in the operation of the windshield wiper.

In FIG. 6 on the other hand, the same signals are represented in the case of abnormal operation, or even non-operation of the motor 13. In fact, the curve aa which represents the signal $CFC_1$, presents a pulse corresponding to the activation of the end-of-travel sensor 5. Now the curve bb, which corresponds to the signal $CFC_2$, presents no pulse corresponding to the activation of the end-of-travel sensor 6, at least not before a time $TETA_1$ has elapsed since the start of the pulse of curve aa. In other words, the pulse of curve cc is prior to the non visible one of curve bb.

In this case, the rising slope of the pulse of curve cc coincides with the passage to the logical state 1 of an imaginary signal '$T_2$' which is visible in curve dd. This signal remains in the logical state 1 during the time $TETA_2$ defined above, which is the time during which the power circuit 9 to the motor is inhibited.

At the end of this time span $TETA_2$, the signal '$T_2$' returns to the logical state 0 while the signals RT and $RCAM_0$, visible in the curves ee and ff respectively, present a pulse whose rising slope coincides with the descending slope of the signal $TETA_2$ of the curve dd.

These signals RT and $RCAM_0$ serve respectively to reset the timer 21 and to conditionally reset the motor powering circuit 9.

The power supply device of the invention, of which a preferred embodiment is presented above, serves to mitigate the disadvantages of the devices of the present state of the art.

Thus, in normal windshield wiping operation or when parking the windshield wiper arm, the powering device serves to trigger one or more attempts to power the motor after detection of an operating fault during a first attempt at powering. This new type of powering device serves to control non-operation of the motor and thus to prevent its destruction.

It is therefore no longer necessary to make use of specific means of protection to the extent that protection of the motor is provided directly by the powering device.

Moreover, when the user switches off the contact key, i.e. when the powering device enters the contactless operating mode, as when the user switches off the control element when the device operates in the contact mode, the windshield wiper arm can always be returned to the parking position, thus clearing the window of the vehicle. However, in case of non-operation of the driving motor when the device is in the contactless operating mode, and if this non-operating condition persists after a certain number of fruitless attempts, the device does not repeat its attempts endlessly, which offers the particular advantage of not discharging the vehicle's battery.

It should be noted that the description of a preferred embodiment of the invention has been given in the framework of a powering device for a single windshield wiper, this for reasons of clarity of this description. However, the scope of the protection claimed is not limited to this type of wiping device and it can be generalized by the man of the art.

We claim:

1. A device for powering an electric motor, particularly for driving a windshield wiper arm of a motor vehicle, of the type comprising:

a control unit connected to user activated control elements and to a means of detection equipped with windshield wiper arm position sensors and comprising:

a motor supply control circuit, controlled by the control unit, wherein the control unit comprises means for interrupting, at least temporarily, the operation of said electric motor at the end of a first time span, which is at least greater than the longest of the round trip times necessary for the arm of the windshield wiper to travel from a given starting position to a given end position and signifying incorrect operation of said windshield wiper arm.

2. The device of claim 1, wherein the means for interrupting the operation of the motor is connected to a means for cutting power to the motor during a second determined time span if said means for interrupting has not been deactivated by activation of a position sensor by the windshield wiper arm.

3. The device of claim 1, characterized in that the control unit serves to trigger at least one new attempt to power the motor after detection of an operating fault during a first powering attempt.

4. The device of claim 1, characterized in that the means for interrupting is connected to the motor supply control circuit.

5. The device of claim 1, characterized in that the means for interrupting, the means of detection, and the control circuit are created as a single integrated circuit.

6. The device of claim 5, wherein said single integrated circuit is an application specific integrated circuit.

7. A device for powering an electric motor, particularly for driving a windshield wiper arm of a motor vehicle, of the type comprising:

a control unit connected to user activated control elements and to a means of detection equipped with windshield wiper arm position sensors and comprising:

a motor supply control circuit, controlled by the control unit, wherein the control unit interrupts, at least temporarily, the operation of said electric motor at the end of a first time span, which is at least greater than the longest of the round trip times necessary for the arm of the windshield wiper to travel from a given starting position to a given end position, and signifying incorrect operation of said windshield wiper arm, and wherein the motor supply control unit is furthermore controlled by a key contact of the vehicle and an element controlling the operation of the motor, both under user control and connected in series between a source of electric power and the control unit, with a power supply terminal of the control unit being connected to the source of supply, in parallel with the key contact and the control element, to enable the unit to control the motor driving the windshield wiper arm so that it returns it to a parking position after the key contact or the control element is switched off.

8. A process for controlling the operation of an electric motor for driving a windshield wiper arm, comprising:

determining a first time period in which said electric motor moves said windshield wiper arm from one extreme position to a second extreme position;

determining a second time period in which said electric motor moves said windshield wiper arm from said second extreme position to said first extreme position; and determining a first time span which is equal to or greater than said first time period and said second time period; and interrupting, at least temporarily, the operation of said electric motor at the end of said first time span, which signifies incorrect operation of said windshield wiper arm.

9. The process of claim 8 further comprising:

switching-on said electric motor upon completion of a second time span to attempt operation of said windshield wiper arm.

10. The process of claim 8 further comprising:

determining a number of attempts for operating said windshield wiper arm;

alternately repeating said inhibiting and switching-on steps to attempt operation of said windshield wiper arm.

11. The process of claim 8 further comprising:

ceasing said alternate repetition after said determined number of attempts are made.

12. The process of claim 8 further comprising:

permanently interrupting the operation of said electric motor after said determined number of attempts are made.

13. A device for powering an electric motor, particularly for driving a windshield wiper arm of a motor vehicle, comprising:

a control unit connected to user activated control elements and to a detector equipped with windshield wiper arm position sensors and comprising:

a motor supply control circuit, controlled by the control unit, wherein the control unit comprises an interrupter so that (1) the operation of said electric motor is interrupted, at least temporarily, at the end of a first time span, which is at least greater than the longest of the round trip times necessary for the arm of the windshield wiper to travel from a given starting position to a given end position, and (2) incorrect operation of said windshield wiper arm is signified.

14. The device of claim 13 wherein the interrupter is connected to a power cutter which cuts power to the motor during a second determined time span if the interrupter has not been deactivated by activation of a position sensor by the windshield wiper arm.

15. The device of claim 13, wherein the control unit serves to trigger at least one new attempt to power the motor after detection of an operating fault during a first powering attempt.

16. The device of claim 13, wherein the interrupter is connected to the motor supply control circuit.

17. The device of claim 13, where the interrupter, the detector and the control circuit of the control unit are created as a single integrated circuit.

18. The device of claim 17, wherein said single integrated circuit is an application specific integrated circuit.

19. The device of claim 13, wherein said interrupter comprises a timer, a clock signal generator and a comparator.

20. A device for powering an electric motor, particularly for driving a windshield wiper arm of a motor vehicle, comprising:

a control unit connected to user activated control elements and to a detector equipped with windshield wiper arm position sensors and comprising:

a motor supply control circuit, controlled by the control unit, wherein the control unit interrupts, at least temporarily, the operation of said electric motor at the end of a first time span, which is at least greater than the longest of the round trip times necessary for the arm of the windshield wiper to travel from a given starting position to a given end position, and signifying incorrect operation of said windshield wiper arm, and wherein the motor supply control unit is furthermore controlled by a key contact of the vehicle and an element controlling the operation of the motor, both under user control and connected in series between a source of electric power and the control unit, with a power supply terminal of the control unit being connected to the source of supply, in parallel with the key contact and the control element, to enable the unit to control the motor driving the windshield wiper arm so that it returns it to a parking position after the key contact or the control element is switched off.

* * * * *